United States Patent
Xia et al.

(10) Patent No.: US 9,137,705 B2
(45) Date of Patent: Sep. 15, 2015

(54) APPARATUS AND METHOD FOR HOME AGENT INITIATED FLOW BINDING

(75) Inventors: Yangsong Xia, Richardson, TX (US); Behcet Sarikaya, Wylie, TX (US)

(73) Assignee: Futurewei Technologies, Inc., Plano, TX (US)

( * ) Notice: Subject to any disclaimer, the term of this patent is extended or adjusted under 35 U.S.C. 154(b) by 466 days.

(21) Appl. No.: 12/759,371

(22) Filed: Apr. 13, 2010

(65) Prior Publication Data

US 2010/0265902 A1 Oct. 21, 2010

Related U.S. Application Data

(60) Provisional application No. 61/171,322, filed on Apr. 21, 2009.

(51) Int. Cl.
| | |
|---|---|
| *H04W 4/00* | (2009.01) |
| *H04W 28/08* | (2009.01) |
| *H04W 60/06* | (2009.01) |
| *H04W 76/04* | (2009.01) |
| *H04W 80/04* | (2009.01) |

(52) U.S. Cl.
CPC .............. *H04W 28/08* (2013.01); *H04W 60/06* (2013.01); *H04W 76/041* (2013.01); *H04W 80/04* (2013.01)

(58) Field of Classification Search
USPC .................................................. 370/310–350
See application file for complete search history.

(56) References Cited

U.S. PATENT DOCUMENTS

| | | | |
|---|---|---|---|
| 2004/0208187 A1* | 10/2004 | Mizell et al. ................. | 370/401 |
| 2005/0195782 A1 | 9/2005 | Yokota et al. | |
| 2006/0129630 A1* | 6/2006 | Catalina-Gallego et al. . | 709/203 |
| 2008/0043758 A1* | 2/2008 | Giaretta et al. ............... | 370/400 |
| 2009/0265767 A1* | 10/2009 | Rune et al. ......................... | 726/5 |
| 2010/0241737 A1* | 9/2010 | Hirano et al. ................. | 709/220 |

FOREIGN PATENT DOCUMENTS

| | | |
|---|---|---|
| CN | 101383755 A | 3/2009 |
| EP | 1571784 A2 | 9/2005 |
| EP | 1968272 A1 | 9/2008 |
| EP | 2045977 A1 | 4/2009 |

OTHER PUBLICATIONS

Soliman, H. et al, "Flow Bindings in IPv6 and NEMO Basic Support," draft-ietf-mext-flow-binding-01.txt; Feb. 2009.*

(Continued)

*Primary Examiner* — Ricky Ngo
*Assistant Examiner* — Wei-Po Kao
(74) *Attorney, Agent, or Firm* — Conley Rose, P.C.; Grant Rodolph; Brandt D. Howell (57) ABSTRACT

An apparatus comprising a home agent (HA) configured to initiate a flow binding operation for a mobile node (MN) by sending a first message to the MN and receiving a second message from the MN, wherein the first message indicates the flow binding operation to the MN, and wherein the MN returns the second message to the HA in response to the first message. Also disclosed is a network component comprising at least one processor configured to implement a method comprising receiving a first message from a HA to initiate a flow binding operation for a flow, and sending a second message to the HA. Included is a method comprising transmitting to a MN a flow binding message to perform a flow binding action for the MN.

21 Claims, 4 Drawing Sheets

(56) References Cited

OTHER PUBLICATIONS

Muhanna, A., et al, "Binding Revocation for IPv6 Mobility," draft-ietf-mext-bind-revocation-05.txt; Mar. 2009.*

Xia, et al., "Home Agent Initiated Flow Binding for Mobile IPv6," draft-xia-mext-ha-init-flow-binding-01.txt; Oct. 19, 2009.

Xia, et al., "Home Agent Initiated Flow Binding for Mobile IPv6," draft-xia-mext-ha-init-flow-binding-00.txt; Apr. 22, 2009.

Bradner, S., "Key Words for Use in RFCs to Indicate Requirement Levels," BCP 14, RFC 2119, Mar. 1997.

Gundavelli, S., et al., "Proxy Mobile IPv6," RFC 5213, Aug. 2008.

Johnson, D., et al., "Mobility Support in IPv6," RFC 3775, Jun. 2004.

Thomson, S., et al, "IPv6 Stateless Address Autoconfiguration," RFC 4862, Sep. 2007.

Postel, J., "Internet Control Message Protocol," STD 5, RFC 792, Sep. 1981.

Conta, A., et al., "Internet Control Message Protocol (ICMPv6) for the Internet Protocol Version 6 (IPv6) Specification," RFC 4443, Mar. 2006.

Soliman, H., et al., "Flow Bindings in IPv6 and NEMO Basic Support," draft-ietf-mext-flow-binding-03.txt; Jul. 2009.

Haley, B., et al., "Mobile IPv6 Generic Signaling Message," draft-ietf-mext-generic-signaling-message-00.txt, Aug. 2008.

Muhanna, A., et al., "Binding Revocation for IPv6 Mobility," draft-ietf-mext-binding-revocation-13.txt, Sep. 2009.

Soliman, H., "Mobile IPv6 Support for Dual Stack Hosts and Routers," draft-ietf-mext-nemo-v4traversal-10.txt, Apr. 2009.

Wakikawa, R., et al., Multiple Care-of Addresses Registration, RFC 5648, Oct. 2009.

Tsirtsis, G., et al., "Binary Traffic Selectors for FB," draft-ietf-mext-binary-ts-00.txt, Jul. 2009.

Soliman, H., et al., "Flow Bindings in IPv6 and NEMO Basic Support," draft-ietf-mext-flow-binding-01.txt; Feb. 2009.

Muhanna, A., et al., "Binding Revocation for IPv6 Mobility," draft-ietf-mext-binding-revocation-05.txt, Mar. 2009.

Larsson, C., et al., "Flow Distribution Rule Language for Multiple-Access Nodes," draft-larsson-mext-flow-distribution-rules-02.txt, Feb. 2009.

Xia, et al., "Home Agent Initiated Flow Binding for Mobile IPv6," draft-xia-mext-ha-init-flow-binding-03.txt; Apr. 5, 2010.

Xia, et al., "Home Agent Initiated Flow Binding for Mobile IPv6," draft-xia-mext-ha-init-flow-binding-02.txt; Mar. 24, 2010.

Soliman, H., "Mobile IPv6 Support for Dual Stack Hosts and Routers," RFC 5555, Jun. 2009.

Soliman, H., "Mobile IPv6 Support for Dual Stack Hosts and Routers," draft-ietf-mext-nemo-v4traversal-09.txt, Jun. 2009.

Wakikawa, R., et al., Multiple Care-of Addresses Registration, draft-ietf-monami6-multiplecoa-13.txt, Apr. 20, 2009.

Tsirtsis, G., et al., "Binary Traffic Selectors for FB," draft-ietf-mext-binary-ts-04.txt, Feb. 26, 2010.

Soliman, H., et al., "Flow Bindings in IPv6 and NEMO Basic Support," draft-ietf-mext-flow-binding-06.txt; Mar. 1, 2010.

Muhanna, A., et al., "Binding Revocation for IPv6 Mobility," draft-ietf-mext-binding-revocation-14.txt, Oct. 2009.

Wakikawa, R., Ed., "Home Agent Reliability Protocol," draft-ietf-mip6-hareliability04.txt, Jul. 14, 2008.

Wakikawa, R., Ed., "Home Agent Reliability Protocol," draft-ietf-mip6-hareliability05.txt, Jul. 13, 2009.

Haley, B., et al., "Mobility Header Home Agent Switch Message," RFC 5142, Jan. 2008, 14 pages.

Muhanna, A., et al., "Binding Revocation for IPv6 Mobility," draft-muhanna-mip6-binding-revocation-01.txt, May 29, 2007, 18 pages.

Foreign Communication From a Related Counterpart Application, European Application No. 10766624.0, Extended European Search Report dated Apr. 20, 2012, 7 pages.

Foreign Communication From a Related Counterpart Application, PCT Application No. PCT/CN2010/071902, International Search Report dated Jul. 22, 2010, 3 pages.

Foreign Communication From a Related Counterpart Application, PCT Application No. PCT/CN2010/071902, Written Opinion dated Jul. 22, 2010, 8 pages.

Perkins, C., Ed., et al., "Mobility Support in IPv6," RFC 6275, Jul. 2011, 169 pages.

Bagnulo, M., et al., "Stateful NAT64: Network Address and Protocol Translation from IPv6 Clients to IPv4 Servers," RFC 6146, Apr. 2011, 45 pages.

Narten, T., et al., "Guidelines for Writing an IANA Considerations Section in RFCs," RFC 5226, May 2008, 27 pages.

Johnson, D., et al., "Mobility Support in IPv6," draft-ietf-mext-rfc3775bis-05.txt, Oct. 19, 2009, 174 pages.

Johnson, D., et al., "Mobility Support in IPv6," draft-ietf-mext-rfc3775bis-03.txt, Mar. 9, 2009, 176 pages.

Bagnulo, M., et al., "Stateful NAT64: Network Address and Protocol Translation from IPv6 Clients to IPv4 Servers," draft-ietf-behave-v6v4-xlate-stateful-11, Mar. 30, 2010, 42 pages.

Bagnulo, M., et al., "NAT64: Network Address in Protocol Translation from IPv6 Clients to IPv4 Servers," draft-bagnulo-behave-nat64-03, Mar. 7, 2009, 26 pages.

* cited by examiner

APPARATUS AND METHOD FOR HOME AGENT INITIATED FLOW BINDING

CROSS-REFERENCE TO RELATED APPLICATIONS

The present application claims priority to U.S. Provisional Patent Application No. 61/171,322 filed Apr. 21, 2009 by Yangsong Xia et al. and entitled "Home Agent Initiated Flow Binding for Mobile IPv6," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In modern wireless access networks, users are allowed to freely move between access points without the user having to configure his mobile node (MN) for each access point. Specifically, the MN's communication with each access point may be coordinated using a home agent (HA). In Internet Protocol (IP) version 6 (IPv6) networks, a MN in a wireless access network can initiate a flow binding session with a HA, for example to receive a service from a service provider. As such, the MN may exchange a flow (e.g. traffic, data stream, etc.) on a local interface/link with the HA. The flow binding can be established by exchanging flow binding messages between the MN and the HA. If the MN relocates to a second wireless access network, the MN can initiate a second flow binding with the HA to redirect the flow to the second wireless access network.

SUMMARY

In one embodiment, the disclosure includes an apparatus comprising a HA configured to initiate a flow binding operation for a MN by sending a first message to the MN and receiving a second message from the MN, wherein the first message indicates the flow binding operation to the MN, and wherein the MN returns the second message to the HA in response to the first message.

In another embodiment, the disclosure includes a network component comprising at least one processor configured to implement a method comprising receiving a first message from a HA to initiate a flow binding operation for a flow, and sending a second message to the HA.

In yet another embodiment, the disclosure includes a method comprising transmitting to a MN a flow binding message to perform a flow binding action for the MN.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Based on the Internet Engineering Task Force (IETF) document draft-ietf-mext-flow-binding-06, a MN may bind a flow to a care-of-address (CoA) without affecting other flows that may be associated with the same home address (HoA) for the MN. The MN may also initiate a binding update (BU)/binding acknowledgement (BA) message exchange with a HA to add, modify, and/or refresh flow binding with the HA. However, in some cases it may be useful to allow the HA to manage flow binding operations. For instance, the HA may need to revoke a flow binding for reasons such as accounting insufficiency for the MN, multiple established flows for the MN, redirecting the flow due to limited network resource availability, or provisioning default flow binding rules based on the MN's default profile.

Disclosed herein is a system and method for enabling a HA to manage flow binding operations for a MN in Mobile IPv6. To manage the flow binding operations, the HA may initiate a FBI/FBA message exchange with the MN to trigger a flow binding operation. The flow binding operation may add a new binding cache entry (BCE) at the HA or may be associated with an existing BCE at the HA. The FBI/FBA message exchange may comprise messages comprising a mobility header comprising a FBI message and/or a FBA message, which may each comprise one of a plurality of mobility options that indicate the flow binding operation. The mobility options may include adding a flow binding, deleting a flow binding, modifying a flow binding, refreshing a flow binding, moving a flow binding, and switching a flow binding. Alternatively, the mobility option may comprise a HA sub-option or a target CoA sub-option. The HA may also manage flow binding operations for MNs that support IP version four (IPv4).

Figure 1:
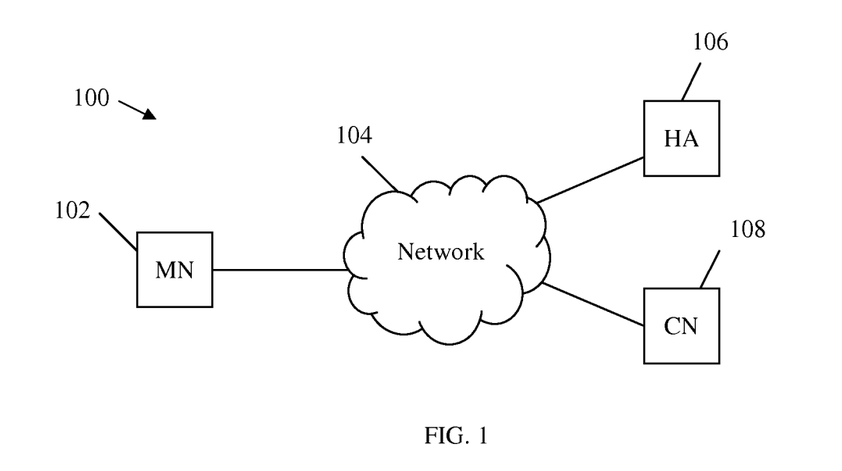
FIG. 1 is a schematic diagram of an embodiment of a wireless system.

FIG. 1 illustrates an embodiment of a wireless system 100. The wireless system 100 may comprise a MN 102, a network 104, a HA 106, and a correspondent node (CN) 108, all of which may be in communication with each other as shown in FIG. 1. The wireless system 100 may be an IP system, such as an IP version 4 (IPv4) system, an IPv6 system, or combinations thereof. Alternatively, the wireless system 100 may be any other type of data communications system implementing any other suitable protocol, perhaps in combination with IP. It will be appreciated that FIG. 1 is only one embodiment of the wireless system 100, and that the wireless system 100 may comprise additional components including additional MNs 102, networks 104, HAs 106, CNs 108, or combinations thereof.

The MN 102 may be any device or component that uses the network 104 and/or the HA 106 to communicate with the CN 108. Typically, the MN 102 may be a mobile user-oriented device that communicates wirelessly with the HA 106 via the network 104 and/or a foreign agent (FA), but the MN 102 should not be limited as such. For example, the MN 102 may be a cellular phone, a notebook computer, a personal digital assistant (PDA), or any other wireless device. In some embodiments, the MN 102 may be a fixed user-oriented device, such as a desktop, that uses wireless access to communicate with the HA 106.

The network 104 may be any device, component, or network that exchanges data between the MN 102, the HA 106, and/or the CN 108. For example, the network 104 may be a Packet Switched Network (PSN), such as a local area network (LAN), a metropolitan area network (MAN), a wide area network (WAN), an intranet, or the Internet. Alternatively, the network 104 may be a circuit switched network, such as a public switched telephone network (PSTN), or any other network. The network 104 may comprise a plurality of access links that allow the MN 102, the HA 106, and/or the CN 108 to independently couple to the network 104 via wireless or wired, e.g. electrical or optical, means. In some embodiments, the network 104 may comprise or may be part of a base transceiver station (BTS), a base station controller, a FA, or the like, and/or may use such to communicate with the MN 102.

The HA 106 may be any device or component that allows the MN 102 to communicate with the CN 108. The HA 106 may communicate with the MNs 102 through the network 104 or may communicate directly with the MN 102. The HA 106 may be a router in that it forwards packets that may not be explicitly addressed to the HA 106 but to other nodes, e.g. the FA, the MN 102, and/or the CN 108. The HA 106 may be responsible for maintaining the MN's 102 reachability state and may be the topological anchor point for the MN's 102 home network prefix. As such, the HA 106 may contain a BCE for each flow associated with each MN 102 with which the HA 106 is associated. In an embodiment, the HA 106 may act as a dynamic host configuration protocol (DHCP) client and/or an Authentication, Authorization, and Accounting (AAA) client, and may comprise an address cache. In addition, the HA 106 may handle IP routing for the MNs 102, which may relocate or roam into different networks (not shown).

In an embodiment, the CN 108 may be any device, component, or network that exchanges data with the HA 106 and/or the MN 102. For example, the CN 108 may be another MN 102, a server, another network, or any other device, component, or network configured to send and/or receive data. Alternatively, the CN 108 may be a component that exchanges data between the system 100 and an external network, such as a wireless router.

The components described above may communicate with each other via fixed and/or wireless links using a variety of technologies. The wireless links may be created dynamically when the MN 102 attaches to the HA 106 directly or through the network 104. The wireless links may be implemented using a multiple access technology, such as Code Division Multiple Access (CDMA), Orthogonal Frequency Division Multiple Access (OFDMA), or Time Division Multiple Access (TDMA). Examples of suitable wireless link technologies include the Worldwide Interoperability for Microwave Access (WiMAX), Wireless Fidelity (WiFi), Wideband CDMA (WCDMA), Global System for Mobile communications (GSM), Enhanced Data for GSM Evolution (EDGE), Universal Mobile Telecommunication Systems (UMTS), Third Generation Partnership Project (3GPP), Third Generation Partnership Project 2 (3GPP2), Advanced Mobile Phone Service (AMPS), one of the Institute of Electrical and Electronic Engineers (IEEE) 802 wireless networks, such as 802.16d/e, or any other wireless network. The remaining components may be coupled together via fixed links, such as electrical or optical links. Examples of suitable fixed link technologies include IP, Ethernet, Asynchronous Transfer Mode (ATM), Frame Relay, Synchronous Optical Network (SONET), and Synchronous Digital Hierarchy (SDH). The fixed and wireless links may have a fixed bandwidth such that a fixed amount of data is transported over the link, or may have a variable-sized bandwidth.

In an embodiment, the MN 102 may establish a plurality of interfaces with the network 104 and/or other wireless networks. For example, the MN 102 may be a dual-mode cellular phone configured for both 3GPP access and WiFi access. The MN 102 may be operated, e.g. by a user, under a signed Service Level Agreement (SLA) with an operator. The SLA agreement may comprise information about the 3GPP access and WiFi access, such as access priority for 3GPP over WiFi when providing Voice-over-IP (VoIP) service. For instance, the 3GPP access may be used when making a call and the WiFi access may be used when receiving an IP service, e.g. IP television (IPTV), and/or Peer-to-Peer (p2p) download. The MN's default profile, which may comprise SLA information, may be downloaded from an AAA server to the MN 102 via the HA 106, e.g. during the registration of the MN 102.

When the system 100 is a Mobile IPv6 system, the system 100 may implement a BU procedure to ensure constant communication between the MN 102 and the HA 106. Before the BU procedure is implemented, the MN 102 and its HA 106 may share a valid, preexisting MN-HA security association (SA). This MN-HA SA may be based on MN-HA Mobility Message Authentication Option described in "Authentication Protocol for Mobile IPv6" by Patel et al, IETF document RFC 4285, January 2006 (RFC 4285), which is incorporated herein by reference. In the BU procedure, the MN 102 may send a BU message to the HA 106, e.g. when the MN 102 roams into a foreign network. The HA 106 may record the MN's address as a BCE, and send a BA message back to the MN 102. The MN 102 may then commence communications with the CN 108. Communications from the CN 108 to the MN 102 are routed to the HA 106, and then to the MN 102. Similarly, communications from the MN 102 to the CN 108 are routed to the HA 106, and then to the CN 108.

As described above, the BU/BA message exchange in the BU procedure may be initiated by the MN 102 to bind a flow for the MN 102. A BU/BA message exchange may also be initiated by the MN 102 to discard or remove a flow binding for the MN 102. In an embodiment, the HA 106 may also be configured to initiate a flow binding operation using a flow binding message exchange. The flow binding operation may add a new BCE or may be associated with an existing BCE at the HA 106. Specifically, the HA 106 may initiate a FBI/FBA message exchange with the MN 102 to trigger a flow binding operation for a BCE. The flow binding operation may comprise adding, deleting, modifying, refreshing, moving, or switching a flow binding for the MN 102. The flow binding operation may also be acknowledged by the MN 102 to indicate success or failure of the operation.

For instance, the HA 106 may be configured to revoke a flow binding for the MN 102, e.g. for network administrative reasons. For example, the HA may need to reboot some of its line cards or its central processor unit (CPU) may reach a critical operating threshold, which may cause the HA 106 to delete existing flow binding for the MN 102. Hence, the HA 106 may send a FBI message to the MN 102 to inform the MN 102 that its flow binding is revoked and that the MN 102 is no longer able to receive IP mobility service for a given flow.

The HA 106 may also be configured to trigger an inter-interface flow binding movement, where a flow may be moved between different interfaces of the MN 102. For example, the operator may be scheduled to perform a routine maintenance for its network WiFi devices when a MN, such as dual-mode cellular phone, is using wireless LAN (WLAN) access to receive a call and for downloading from the operator's network. In this case, the operator may need to move the call and the downloading link from the MN's WLAN or WiFi interface to the MN's 3GPP interface during maintenance time and then possibly move back the call and downloading link to the WiFi interface after maintenance is completed. The HA 106 may trigger the inter-interface flow binding movement by sending a FBI message to the MN 102.

The HA 106 may also be configured to limit the MN's traffic from exceeding traffic quota. For example, a third generation (3G) operator that provides mobile broadband service may allow a flat service rate for a subscribed MN until a quota on exchanged amount of traffic per month is reached, for example a quota of about five Gigabytes of data, which the operator may allow to be downloaded at the network's maximum allowable download rate. When this traffic quota is reached, the allowed service rate for the MN 102 may be substantially reduced, e.g. to limit the amount of further exchanged traffic, and/or the operator may charge for additional downloaded data. These limitations may not prevent the user from using 3G access for mobile broadband services. However, the operator may notify the user when the quota is about to be reached, e.g. based on tracking the MN's traffic by the operator. The operator may send to the MN 102 a modified flow descriptor or an existing flow descriptor excluding the flow binding identification number (BID) in the FBI message to propose to the user to switch from 3G access to another access mode, e.g. WLAN access.

The HA 106 may also be configured for real-time MN 102 traffic off-load. For example, the 3G operator may want to move a user traffic flow to another access mode due to increased traffic load in the 3G access network, e.g. to guarantee available bandwidth for prioritized services. As such, the HA 106 may move the MN's established sessions by sending a FBI message to the MN 102, e.g. without specifying to which interface the sessions should be moved.

Figure 2:
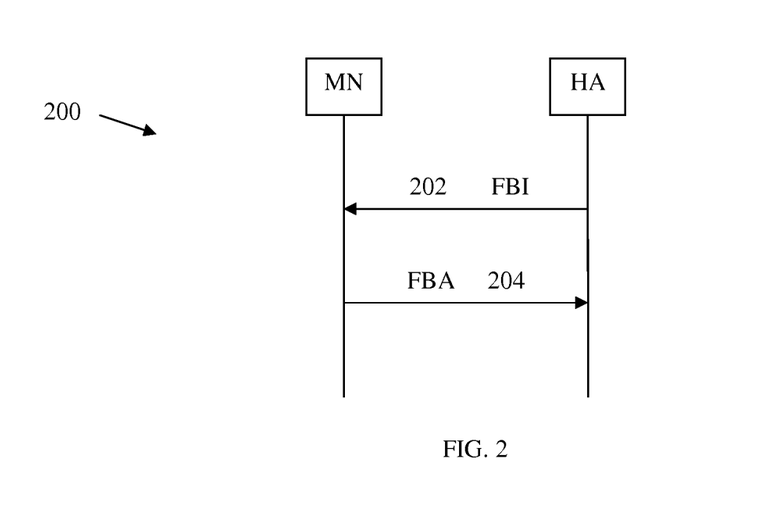
FIG. 2 is a protocol diagram of an embodiment of a flow binding message exchange.

FIG. 2 illustrates an embodiment of a flow binding message exchange 200, which may be initiated by a HA (e.g. HA 106) to add or modify a flow binding for a MN (e.g. MN 102). The flow binding message exchange 200 may comprise a FBI message 202 and a FBA message 204. Each of the FBI message 202 and the FBA message 204 may support the IPv6 or the IPv4 and is described in further detail below. To initiate a flow binding operation, the HA may send a FBI message 202 to the MN. The FBI message 202 may comprise the MN's CoA as the SA in the message, e.g. in a mobility header of the message. The FBI message 202 may also comprise at least one mobility option, e.g. in the message payload, that indicates the flow binding operation. Additionally, the FBI message 202 may comprise an acknowledgement (A) bit that when set causes the MN to send the FBA message 204 back to the HA. A lifetime value may also be included in the message to specify the remaining lifetime of the flow binding. When the MN receives the FBI message 202, the MN may process the mobility option in the FBI message 202 to implement the specified flow binding operation. After the FBI message 202 has been processed, the MN may send the FBA message 204 to the HA to acknowledge receipt of the FBI message 202. The FBA message 204 may also comprise a mobility header and a payload including a mobility option.

The flow binding operations initiated by the HA, e.g. using the flow binding message exchange 200, may comprise adding a flow binding. A flow may be added for a MN by associating a flow with a CoA for the MN. The CoA may be indicated as a destination address (DA) in a flow binding message or in an alternate CoA option. Alternatively, the CoA for the MN may be indicated in a target CoA sub-option, as described below. In an embodiment, the HA may not use a BID to add flow binding for the MN. Instead, the HA may send a mobility option, also referred to herein as a flow identification mobility option, in a FBI message to the MN. The mobility option may be described in draft-ietf-mext-flow-binding-06, and may comprise an action field that indicates a flow binding add operation. Additionally, the mobility option may comprise a flow identifier (FID), which may uniquely identify a flow for a receiver of the message, e.g. a MN. The same FID may be used and sent to a second receiver, e.g. a second MN, to identify a second flow for the second MN.

The flow binding operations initiated by the HA may also comprise deleting a flow binding. To delete or remove a flow binding for a MN, the HA may send a mobility option in a FBI message to the MN. The mobility option may comprise an action field that indicates a flow binding delete operation. Additionally, the mobility option may comprise a FID that uniquely identifies an existing flow binding for the MN. Thus, the MN may use the FID to identify the flow binding and remove it. In an embodiment, the HA may first receive a BU message from the MN, which may comprise a mobility option that registers a new flow for the MN. If the HA decides to revoke the new flow registered by the MN, the HA may send the FBI message indicating the flow binding delete operation to the MN.

The flow binding operations may also comprise modifying a flow binding, such as changing a CoA of a flow and/or other attributes of the flow. Modifying a flow binding may comprise removing an existing flow for a MN and adding a new flow for the MN that has the same FID as the removed flow. The HA may send a mobility option in a FBI message to the MN, which may comprise the FID that identifies the flow to be modified. The mobility option may also comprise a traffic selector sub-option that specifies new attributes to classify the modified flow (e.g. a new CoA). The attributes used to classify the flow may be described in the IETF document draft-ietf-mext-binary-ts-04, which is incorporated herein by reference.

The flow binding operations may also comprise refreshing a flow binding for a MN. In such a case, the HA may send a mobility option in a FBI message to the MN, which may comprise an action field that indicates a flow binding refresh operation. The message may be sent before the expiration of an existing flow binding for the MN, e.g. according to the lifetime indicated for the existing flow binding. The FBI message may comprise substantially all the information previously sent in the last flow binding refresh message to avoid losing the information.

The flow binding operations may also comprise moving a flow binding for a MN. For instance, the HA may send a FBI message to a MN to move a flow associated with a first active interface of the MN to a second active interface of the MN. The FBI message may comprise a mobility option that includes an action field that indicates a flow binding move operation. The mobility option may also comprise a target CoA sub-option that indicates the address of the target interface, e.g. the CoA for the second interface. In some embodiments, the HA may not initiate moving a flow binding from a first interface to a second interface if the MN had already initiated a previous flow binding move from the second interface to the first interface. For example, the MN may decide to move an IP flow from a 3GPP interface to a WLAN interface and send a request to the HA to move the flow binding accordingly. The HA may receive the request and perform the action. However, to avoid multiple flow binding movements initiated between the MN and the HA, the HA may not subsequently send a FBI message to move back the same flow from the WLAN interface to the 3GPP interface. In an embodiment, the HA may be allowed to initiate a second flow binding move between the two interfaces after a first flow binding move initiated by the MN if network conditions require moving the flow binding again, such as when a congestion occurs on the current interface of the flow binding. In such situations, the HA may be more suitable than the MN to detect the network conditions and initiate a flow binding move in response.

The flow binding operations may also comprise switching a flow binding from a first HA to a second HA. The first HA may signal to the MN, e.g. using the FBI message, to switch its flow binding from the first HA to the second HA, for instance when the first HA is overloaded. Alternatively, the first HA may initiate the flow binding switch for the MN to balance the load among the first HA, the second HA, and/or other HAs, to perform periodic reliability maintenance, or for other reasons. The FBI message may comprise a mobility option that indicates to the MN to switch a flow to another HA, which may be specified by an alternate HA address. The flow binding switch operation may be similar to a hard switch operation described in the IETF document draft-ietf-mip6-hareliability-05, which is incorporated herein by reference, where an active HA and a standby HA may have different IP addresses. However, in the hard switch operation, the active HA stops serving the MN and the standby HA begins serving the MN, while in the flow binding switch operation, both the active HA and the standby HA may serve the MN using the same HoA.

The flow binding operations may also comprise revoking a flow binding registration previously initiated by the MN. For example, the HA may revoke a flow binding registration previously initiated by the MN using a flow identification mobility option sent by MN with action set to forward. One possible reason for doing so is that the HA may be overloaded, but there could be other reasons. The HA may revoke the flow binding registration by sending a Binding Revocation Indication message, as defined in draft-ietf-mext-binding-revocation (which is incorporated herein by reference), extended with a flow identification mobility option. The HA may include the flow identification mobility option received from MN, which may have the action field to Revoke. In addition, the MN may send a Binding Revocation Acknowledgement message, as defined in draft-ietf-mext-binding-revocation, to indicate that it has received Binding Revocation Indication message. If the MN accepts the Binding Revocation Indication message, it may set the status code to about zero for success or to about one for partial success, as described in draft-ietf-mext-binding-revocation. Thus, the Binding Revocation Indication and Binding Revocation Acknowledgement messages may be used to carry Flow Identification Mobility Options, as defined in draft-ietf-mext-flow-binding, with the extensions defined herein.

After receiving the FBI message from the HA to trigger a flow binding operation, the MN may return an acknowledgement message, e.g. the FBA message 204, to the HA to acknowledge the reception of the FBI message. Additionally, the MN may copy the information in the FBI message to a mobility option in the FBA message to indicate to the HA which flow binding operation the MN is acknowledging.

In an embodiment, the HA may maintain and update a flow binding list, such as that described in draft-ietf-mext-flow-binding-06, based on the implemented flow binding operation. For instance, if the FBI message sent by the HA indicates a flow binding add operation and the corresponding FBA message from the MN indicates a successful add operation, the HA may add a new entry to the flow binding list. The new entry may comprise some of the field values in the mobility option of the FBI message, such the FID, a flow descriptor, a FID-priority (PRI) field, and/or action field. Additionally, a BID from a binding reference sub-option in the mobility option or a CoA for the flow may be added to the new entry. An active/inactive flag for the new entry may also be set to active. Alternatively, if the FBI message indicates a flow binding delete operation and the corresponding FBA message indicates a successful delete operation, the HA may find a corresponding entry in the flow binding list and delete the entry. If the HA sends a Binding Revocation Indication message comprising a Flow Mobility Option in which the action field is set to Revoke and if the corresponding Binding Revocation Acknowledgement message indicates acceptance, the HA may locate the list entry corresponding to this flow and delete the entry.

If the FBI message indicates a flow binding modify operation and the corresponding FBA message indicates a successful modify operation, the HA may delete the corresponding entry in the flow binding list and add a new entry that comprises at least some of the field values in the mobility option of the FBI message. Alternatively, if the FBI message indicates a flow binding refresh operation and the corresponding FBA message indicates a successful refresh operation, the HA may find the corresponding entry in the flow binding list and set the active/inactive flag for the entry to active. If the FBI message indicates a flow binding move operation and the corresponding FBA message indicates a successful move operation, the HA may find the corresponding entry in the flow binding list and change the BID value of the entry to the CoA in the mobility option of the FBI message. Alternatively, if the FBI message indicates a flow binding switch operation and the corresponding FBA message indicates a successful switch operation, the HA may find the corresponding entry in the flow binding list and delete the entry.

Figure 3:
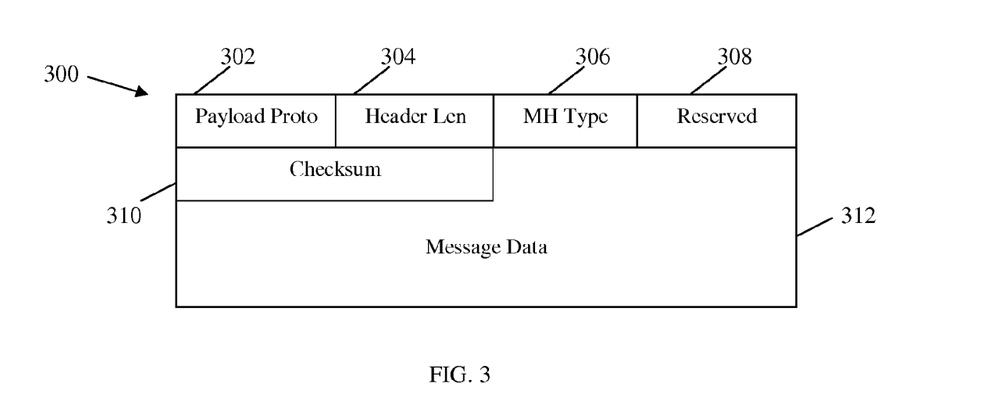
FIG. 3 is a schematic diagram of an embodiment of a mobility header message.

FIG. 3 is an embodiment of a mobility header message 300, which may correspond to the general format of a FBI or a FBA message. The mobility header message 300 may be described in Section 6.1 of the IETF document RFC 3775, which is incorporated herein by reference. The mobility header message 300 may comprise a plurality of fields comprising a Payload Protocol (Proto) 302, a Header Length 304, a Mobility Header (MH) type 306, a reserved field 308, a Checksum 310, and Message Data 312, which may be configured substantially the same as described in RFC 3775. The Message Data 312 may comprise FBI message data or FBA message data and may include a mobility option that indicates the flow binding operation initiated by a HA, as described below.

Figure 4:
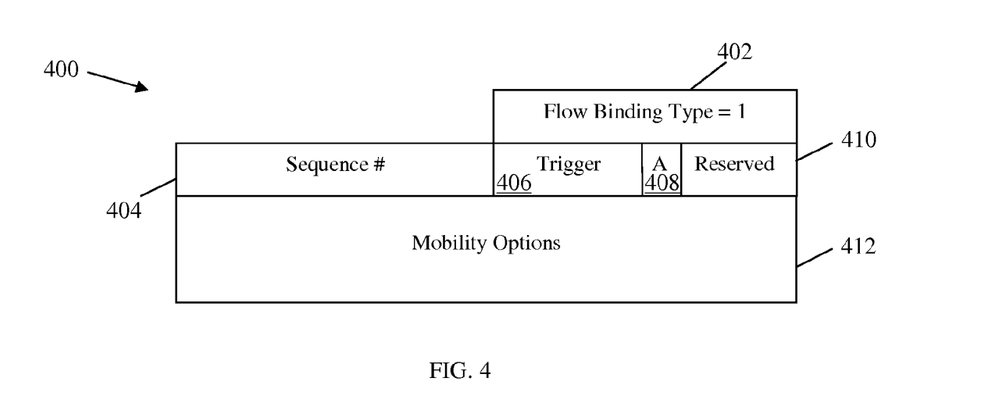
FIG. 4 is a schematic diagram of an embodiment of a flow binding indication (FBI) message data.

FIG. 4 is an embodiment of a FBI message data 400, which may be included in the Message Data 312 of the mobility header message 300. Using the FBI message data 400 in the mobility header message 300 may configure the message as a FBI message, which may be sent by a HA to a MN to initiate a flow binding operation. Accordingly, the MH Type 306 in the mobility header message 300, which comprises the FBI message data 400, may comprise a value that indicates a flow binding message. The FBI message data 400 may comprise a plurality of fields comprising a Flow Binding Type 402, a Sequence Number 404, a Trigger field 406, an A bit flag 408, a Reserved field 410, and at least one Mobility Option 412.

The Flow Binding Type 402 may have a value equal to about one to indicate that the message data corresponds to a FBI message. The Sequence Number 404 may be used by the HA to match a FBI message with a returned FBA message from the MN that corresponds to the FBI message. The Trigger field 406 may comprise a value that indicates the event which triggered the HA to send the FBI message. The trigger value may be equal to about one to indicate an unspecified event, equal to about two to indicate an administrative reason to trigger, or equal to about three to indicate a possible Out-of-Sync BCE state. Alternatively, the trigger value may be equal to about zero, which may be a reserved value that is not be used or that indicates other reasons. Other trigger values may also be defined or reserved. The A bit flag 408 may be set by the HA (e.g. to about one or about zero) to request a FBA message be returned from the MN upon receiving the FBI message. The Reserved field 410 may not be used or may be reserved for other purposes. In an embodiment, the length of each of the Flow Binding Type 402 and the Sequence Number 404 may be equal to about 16 bits, and the length of the Trigger field 406 may be equal to about eight bits.

The Mobility Option 412 may indicate the flow binding operation (or action) initiated or requested by the HA. The Mobility Option 412 may comprise a value that indicates the initiated or requested action and/or a sub-option that comprises information related to the flow binding operation. For instance, the Mobility Option 412 may comprise an action parameter that is assigned a value between about zero and about two to indicate a flow binding operation, e.g. as described in draft-ietf-mext-flow-binding-06. Additionally, the action parameter value may be equal to about 11 to indicate add a flow binding, equal to about 12 to indicate delete a flow binding, equal to about 13 to indicate modify a flow binding, equal to about 14 to indicate refresh a flow binding, equal to about 15 to indicate move a flow binding, equal to about 16 to indicate switch a flow binding, or equal to about 17 to indicate revoke a flow binding. The action parameter value may also be equal to other values that may be reserved, e.g. for other operations. In an embodiment, the length of the action parameter may be equal to about eight bits. The length of the Mobility Option may vary such that the total length of the Mobility Header 300 may be an integer multiple of eight octets.

Figure 5:
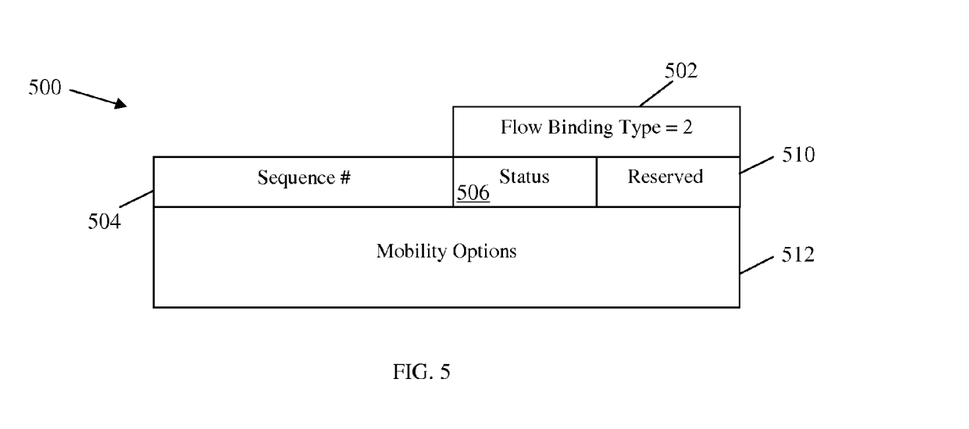
FIG. 5 is a schematic diagram of an embodiment of a flow binding acknowledgement (FBA) message data.

FIG. 5 is an embodiment of a FBA message data 500, which may be included in the Message Data 312 of the mobility header message 300. Using the FBA message data 400 in the mobility header message 400 may configure the message as a FBA message, which may be sent by the MN to the HA to acknowledge receiving a FBI message. Accordingly, the MH Type 306 in the mobility header message 300, which comprises the FBA message data 500, may comprise a value that indicates a flow binding message. The FBA message data 500 may comprise a plurality of fields comprising a Flow Binding Type 502, a Sequence Number 504, a Status field 506, a reserved field 510, and at least one Mobility Option 512.

The Flow Binding Type 502 may have a value equal to about two to indicate that the message data corresponds to a FBA message. The MN may copy the Sequence Number 504 and the Mobility Option 512 from the corresponding fields in the received FBI message from the HA. The Status field 506 may comprise a value that indicates the result of processing the FBI message or request. The status value may be less than about 128 to indicate that the FBI message, and hence the flow binding operation, was processed successfully by the MN. Alternatively, the status value may be greater than about 128 to indicate that the FBI message, and hence the flow binding operation, was not processed successfully by the MN. The status value may be equal to about zero to indicate success, equal to about one to indicate partial success, or equal to about 128 to indicate that the flow binding in the FBI message does not exist. Other status values may be defined or reserved, e.g. to report other flow binding operation status. In an embodiment, the length of the Flow Binding Type 502 may be equal to about 16 bits, and the length of the Status field 506 may be equal to about eight bits.

Figure 6:
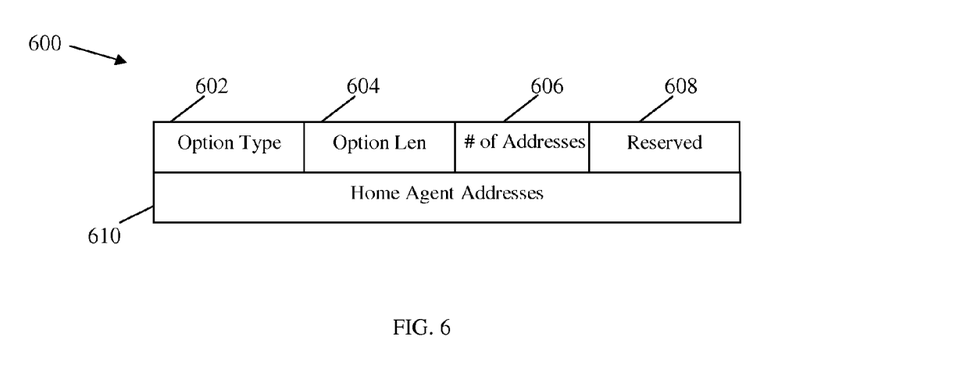
FIG. 6 is a schematic diagram of an embodiment of an alternate HA sub-option.

FIG. 6 is an embodiment of an alternate HA sub-option 600, which may be included in the Mobility Option 412 of the FBI message data 400 or the Mobility Option 512 of the FBA message data 500. The alternate HA sub-option 600 may be used by the HA to indicate to the MN to switch a flow binding from the HA to a second HA. The alternate HA sub-option 600 may comprise a plurality of fields comprising an Option Type 602, an Option Length 604, a Number of Addresses field 606, a Reserved field 608, and a HA Addresses field 610.

The Option Type 602 may be assigned a value that indicates an alternate HA sub-option or that indicates a request to the MN to switch the current HA. The Option Length 604 may specify the length of the alternate HA sub-option 600, e.g. in units of about eight octets. The Number of Addresses field 606 may indicate the quantity of HA home address (e.g. for alternate HAs) in the alternate HA sub-option 600. The Reserved field 608 may not be used or may be reserved for other purposes. The HA Addresses field 610 may comprise the home addresses (e.g. IP addresses) for other alternate HAs. The HA home addresses may be IPv6 and/or IPv4 addresses.

Figure 7:
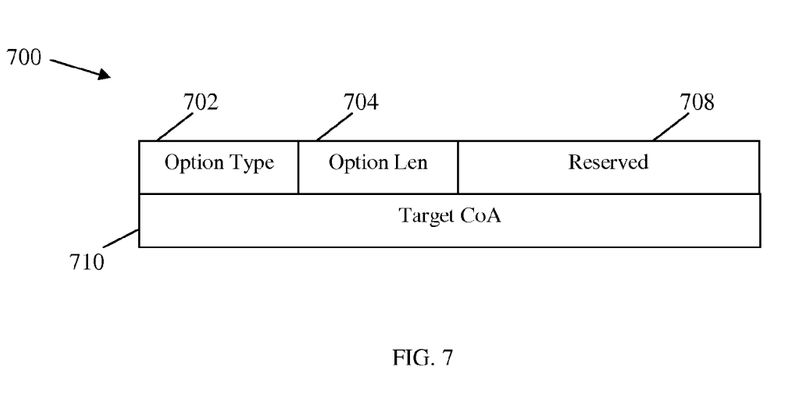
FIG. 7 is a schematic diagram of an embodiment of a target care-of-address sub-option.

FIG. 7 is an embodiment of a target CoA sub-option 700, which may be included in the Mobility Option 412 of the FBI message data 400 or the Mobility Option 512 of the FBA message data 500. The target CoA sub-option 700 may be used by the HA to indicate to the MN to move a flow binding from a first interface to a second interface. The target CoA sub-option 700 may comprise a plurality of fields comprising an Option Type 702, an Option Length 704, a reserved field 708, and a target CoA 710. The Option Type 702, the Option Length 704, and the Reserved field 708 may be configured similar to the corresponding fields in the alternate HA sub-option 600. The target CoA 710 may comprise the address (e.g. IP address) for the second interface to which the MN may move the flow binding to. The target CoA 710 may comprise an IPv6 or IPv4 address.

Figure 8:
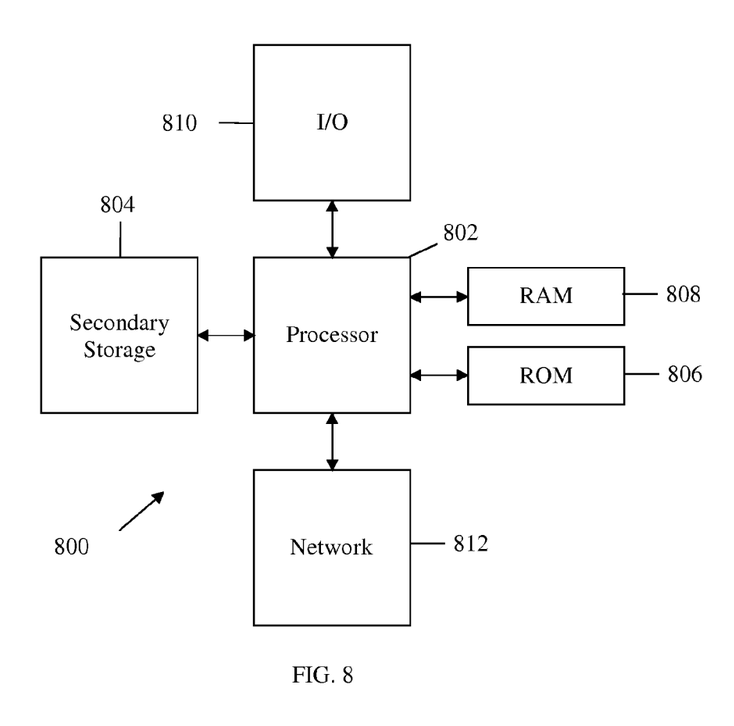
FIG. 8 is an illustration of an embodiment general-purpose computer system.

The network components described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (which may be referred to as a CPU) that is in communication with memory devices including secondary storage 804, read only memory (ROM) 806, random access memory (RAM) 808, input/output (I/O) devices 810, and network connectivity devices 812. The processor 802 may be implemented as one or more CPU chips, or may be part of one or more application specific integrated circuits (ASICs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a home agent (HA) configured to initiate a flow binding operation for a mobile node (MN) that is associated with a home address by sending a flow binding indication (FBI) message to the MN and receiving a flow binding acknowledgement (FBA) message from the MN,
wherein the FBI message comprises at least one mobility option that indicates the flow binding operation to the MN,
wherein the FBI message from the HA to the MN indicates that the MN should perform the flow binding operation by moving a flow from a first interface associated with a first access network to a second interface associated with a second access network,
wherein the flow binding operation does not result in a change to the home address,
wherein the HA receives the FBA message from the MN in response to the FBI message, and
wherein the FBI message is not responsive to a binding update message from the MN.

2. The apparatus of claim 1, wherein the FBI message, the FBA message, or both comprises a mobility header that comprises a message data.

3. The apparatus of claim 2, wherein the message data in the FBI message comprises a sequence number that is used to match the FBI message to the FBA message, and a trigger field that indicates an event that triggered the flow binding operation.

4. The apparatus of claim 3, wherein the message data in the FBA message comprises a sequence number that matches the sequence number of the FBI message, and a status field that indicates whether the flow binding operation is successful.

5. The apparatus of claim 1, wherein the second access network is indicated by a care-of-address (CoA) in the FBI message.

6. A network component comprising:
at least one processor configured to:
register with a network via a home agent (HA) to obtain a home address;
receive a flow binding indication (FBI) message from the HA to initiate a flow binding operation for a flow, wherein the FBI message from the HA indicates a flow binding operation comprising moving a flow from a first interface associated with a first access network to a second interface associated with a second access network, and wherein the FBI message is not responsive to a binding update message from the network component;

send a flow binding acknowledgement (FBA) message to the HA; and complete the flow binding operation without receiving an update to the home address, wherein the flow binding operation is not a flow binding revocation.

7. The network component of claim 6, wherein if the flow binding operation is an add operation, the processor adds a new flow binding by associating a new flow with a care-of-address (CoA), wherein the new flow is specified by a flow identifier (FID) in the FBI message, and wherein the CoA is indicated in the FBI message.

8. The network component of claim 6, wherein if the flow binding operation is a modify operation, the processor deletes a flow and adds a new flow that has the same flow identifier (FID) as the deleted flow and that has new attributes.

9. The network component of claim 6, wherein if the flow binding operation is a move operation, the processor moves a flow from the first interface to the second interface as indicated by a care-of-address (CoA) in the FBI message.

10. The network component of claim 6, wherein if the flow binding operation is switch operation, the processor switches a flow from a first HA to a second HA indicated by an alternate HA address in the FBI message.

11. The network component of claim 6, wherein the processor is further configured to treat the FBI message as an indication to switch between an access mode associated with the first access network to an access mode associated with the second access network in order to avoid exceeding an access mode related traffic quota.

12. A method comprising:

transmitting, by a home agent (HA), a flow binding message to a mobile node (MN) that is associated with a home address, wherein the flow binding message indicates a flow binding operation to be performed by the MN, wherein the flow binding message from the HA to the MN indicates that the MN should perform the flow binding operation comprising moving a flow from a first interface associated with a first access network to a second interface associated with a second access network, and wherein the flow binding message is not responsive to a binding update message from the MN; and receiving, from the MN, a binding acknowledgement message that acknowledges the flow binding operation, wherein the flow binding operation is not a flow binding revocation, and wherein the flow binding operation does not result in a change to the home address.

13. The method of claim 12, wherein the flow binding message indicates adding a flow binding, deleting a flow binding, modifying a flow binding, moving a flow binding, or switching a flow binding.

14. The method of claim 12, wherein the flow binding message comprises an alternate HA that indicates to the MN to switch a flow binding from a first HA to a second HA.

15. The method of claim 12, wherein the flow binding message comprises a target care-of-address (CoA) associated with the second interface.

16. The method of claim 12, wherein the flow binding message indicates the flow should be moved between the first interface and the second interface in order to offload traffic from the first access network to reduce network congestion associated with the first access network.

17. A method implemented in a home agent (HA), wherein the method comprises:

transmitting, by the HA, a first Flow Binding Initiate (FBI) message to a first mobile node (MN) to prompt the first MN to perform a first flow binding operation, wherein the first FBI message indicates a service specific data cap to the first MN by sending modified flow descriptors as a proposal to change access networks for an ongoing session, wherein chap in the access networks for an ongoing session comprises moving a flow from a first MN interface associated with a first access network to a second MN interface associated with a second access network; and receiving a first Flow Binding Acknowledgement (FBA) message from the first MN acknowledging the first FBI message.

18. The method of claim 17, further comprising:

transmitting, by the HA, a second FBI message to a second MN to prompt the second MN to perform a second flow binding operation, wherein the second FIB message indicates a request to move traffic flows between access networks to offload traffic from a congested network by indicating an updated flow descriptor to be offloaded by the second MN, wherein move traffic flows between access networks comprises moving a flow from a first MN interface of the second MN associated with a first access network to a second MN interface of the second MN associated with a second access network; and receiving a second FBA message from the second MN acknowledging the second FBI message.

19. The method of claim 17, wherein the first FBI message comprises:

a flow binding type field set to indicate the first FBI message is a FBI message;

a sequence number field used by the HA to match the first FBA message with the first FBI message;

a trigger field indicating an event that triggered the HA to send the first FBI message;

an Acknowledge (A) field set by the HA to request that the first FBA message be returned upon receipt of the first FBI message; and a mobility options field that indicates the first flow binding operation.

20. The method of claim 19, wherein the first FBI message further comprises a target Care-of Address sub-option that comprises:

a type field that indicates the target Care-of Address sub-option is a target Care-of Address sub-option;

a length field that indicates a length of the target Care-of Address sub-option; and a Target Care-of Address field that indicates an address of an interface that a flow is to be moved to.

21. The method of claim 17, wherein the first FBA message comprises:

a flow binding type field set to indicate the first FBA message is a FBA message;

a sequence number field comprising a sequence number copied from a sequence number field in the first FBI message;

a status field indicating a result of processing the first FBI message by the first MN; and a mobility options field that contains zero or more mobility options.

* * * * *

UNITED STATES PATENT AND TRADEMARK OFFICE
CERTIFICATE OF CORRECTION

PATENT NO. : 9,137,705 B2  
APPLICATION NO. : 12/759371  
DATED : September 15, 2015  
INVENTOR(S) : Yangsong Xia and Behcet Sarikaya Page 1 of 1

It is certified that error appears in the above-identified patent and that said Letters Patent is hereby corrected as shown below:

In the claims

Column 14, lines 3-17, Claim 17 should read:

A method implemented in a home agent (HA), wherein the method comprises:
transmitting, by the HA, a first Flow Binding Initiate (FBI) message to a first mobile node (MN) to prompt the first MN to perform a first flow binding operation, wherein the first FBI message indicates a service specific data cap to the first MN by sending modified flow descriptors as a proposal to change access networks for an ongoing session, wherein changing the access networks for an ongoing session comprises moving a flow from a first MN interface associated with a first access network to a second MN interface associated with a second access network; and
receiving a first Flow Binding Acknowledgement (FBA) message from the first MN acknowledging the first FBI message.

Signed and Sealed this
Twenty-sixth Day of April, 2016

Michelle K. Lee
*Director of the United States Patent and Trademark Office*